United States Patent [19]

Marshak

[11] Patent Number: 4,524,452

[45] Date of Patent: Jun. 18, 1985

[54] AUDIO MIXER/PRE-AMPLIFIER

[76] Inventor: Michael S. Marshak, 3970 Kumquat Ave., Miami, Fla. 33133

[21] Appl. No.: 515,459

[22] Filed: Jul. 20, 1983

[51] Int. Cl.[3] .............................................. H04B 1/00

[52] U.S. Cl. ...................................... 381/28; 381/119

[58] Field of Search ....................... 381/1, 26, 28, 119; 369/2-5, 91, 86

[56] References Cited

U.S. PATENT DOCUMENTS 4,374,300 2/1983 Ponto et al. ......................... 381/119

OTHER PUBLICATIONS

Gerbracht, R., "A High-Quality Stereophonic Mixer", *Audio* (Mar, 1962), pp. 19-23, 53.

Shaw, G. D. "Minimix 6", *Practical Electronics, (Nov. 1975), pp. 904-907.*

*Primary Examiner*—Gene Z. Rubinson
*Assistant Examiner*—W. J. Brady
*Attorney, Agent, or Firm*—Robert M. Schwartz; Edward I. Mates

[57] ABSTRACT

An audio mixer for combining stereo phonograph, stereo high impedance and low impedance input signals having a means for audio previewing one or more of said inputs simultaneously including a means for visually indicating which signals are being previewed, further including a means for audio previewing said signals in a monophonic signal, further including a means for combining said inputs in the final amplifier stage such that the output signal is in a monophonic state, further including a means for disabling said low impedance input from the final output means.

7 Claims, 1 Drawing Figure

AUDIO MIXER/PRE-AMPLIFIER

BACKGROUND OF THE INVENTION

1. Field of the Invention

The present invention relates generally to audio mixers and more particularly to a pre-amplifier mixing stereo audio signals from any conventional source such as phonograph records, magnetic tapes and microphones.

2. Description of the Prior Art

It is well-known to use an audio mixer to combine stereo audio signals, however in the past stereo audio mixers have not been designed with the user/operator in mind. In the present invention, great care has been taken to include all of the features which leading disc jockeys require, permitting greater flexibility to mix audio signals from more than two sources simultaneously, and to change the character of the sound at will.

A typical audio mixer includes the Bozak Model CMA-10-2DL stereo mixer/pre-amplifier. However the Bozak Mixer does not provide the features of the present invention. The Bozak Model shows 2 microphone inputs; however said inputs do not have separate equalization in that the tone controls affect all inputs simultaneously, since the control is done after mixing all input signals. The present invention includes separate tone controls before mixing of the mike inputs, phono inputs and high level inputs.

The Bozak includes a cueing monitor for previewing the inputs to the system, however, said cueing monitor being on a rotory cueing switch is limited to previewing only one input at a time. The present invention includes a separate cue switch for each stereo input; the operator can monitor one or all inputs simultaneously, as required. This phenomenon is caused by the disc jockey's creative desires to preview and synchronize more than one input simultaneously.

Previously in mixers, if there was a failure in the input of one channel, then half the output speakers of the sound system would not play. The present invention eliminates this problem by use of a means to combine both inputs (one of which is dead) to both output channels providing output in all speakers, until the input problem is remedied.

Other patents describing the closest subject matter provide for a number of more or less complicated features that fail to solve the problem in an efficient and economical way. None of these patents suggest the novel features of the present invention.

SUMMARY OF THE INVENTION

It is the main object of this invention to provide an improved and more user orientated audio mixer.

It is an object of this invention to have more than one low impedance microphone input each having independent tone controls.

It is another object of this invention to have independent cue select switches on all stereo inputs each cue switch with corresponding indicator lights.

It is yet another object of this invention to incorporate a program mono switch such that the system will continue operation when one channel of a stereo input fails with corresponding indicator light.

It is another object of this invention to incorporate a means to disable the microphone input to tape output when desired with corresponding indicator light.

It is yet another object of this invention to provide a means that the operator can preview both stereo channels simultaneously in a monaural state without affecting the stereo output, with corresponding indicator light.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts will be more fully understood from the following description, when read in conjunction with the accompanying drawings in which.

DETAILED DESCRIPTION OF THE PREFERRED EMBODIMENT

Figure 1:
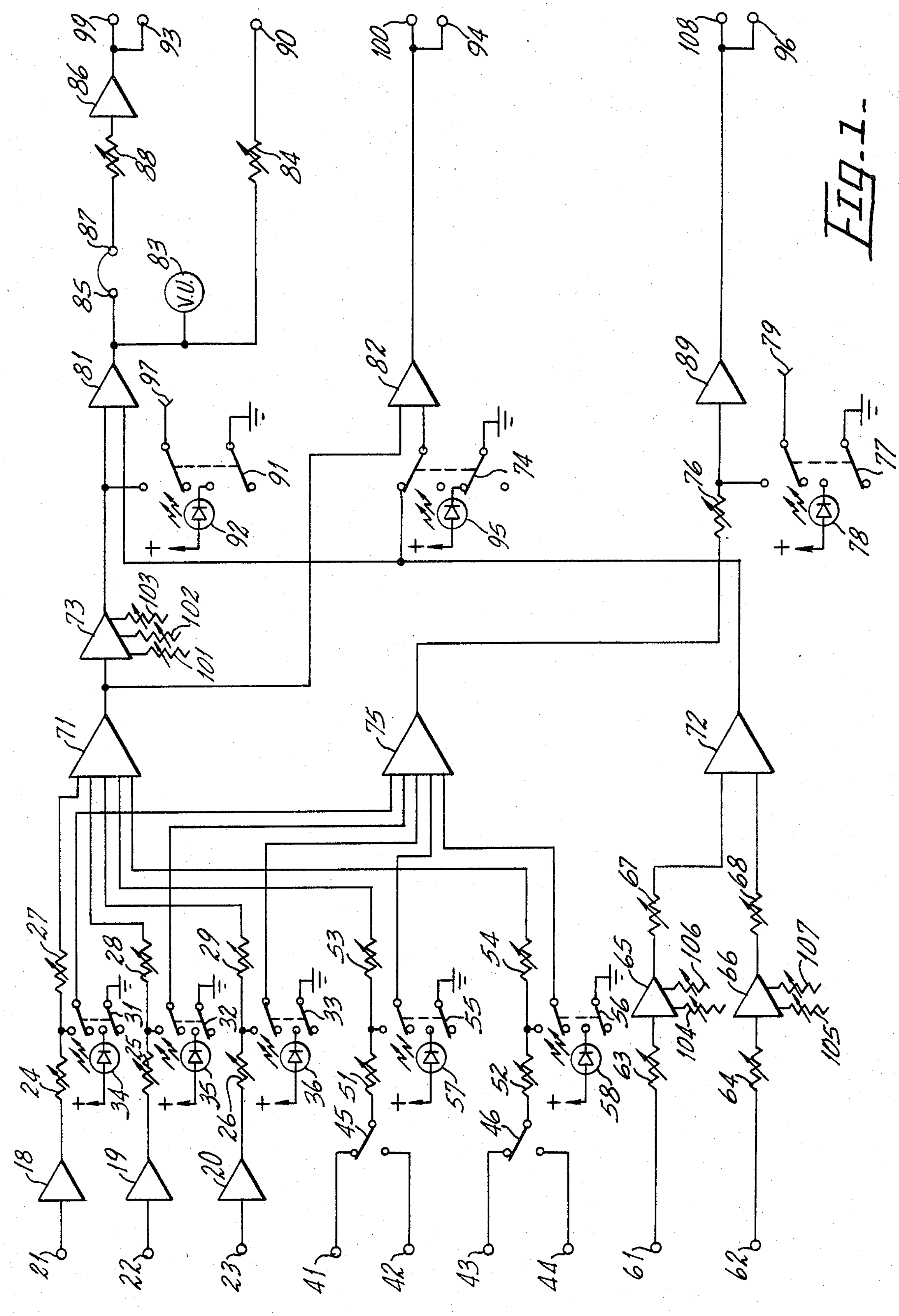
FIG. 1 is a block circuit diagram of the left channel of the audio mixer.

Referring now to FIG. 1, which is a block circuit diagram for the left channel of an audio mixer, and with the understanding that the present invention is a stereo audio mixer having a right and a left channel, said channels being functionally equivalent.

Following this circuit from generally left to right, there are three stereo magnetic phono inputs 21, 22 and 23, respectively, each having individual R.I.A.A. magnetic phono pre-amplifiers 18, 19, and 20, respectively, and each having independent balance controls 24, 25, and 26, respectively and independent volume controls 27, 28, and 29 respectively. It can be noted that each phono input also has independent cue select switches 31, 32 and 33, respectively, with each cue switch having a corresponding cue indicator light 34, 35, and 36, respectively.

Each of said cue switches activates that respective individual input to a cue mode, allowing the user/operator to preview the audio signal prior to the signal reaching the main output as will be described in more detail below.

The audio mixer also has four high level inputs 41, 42, 43, and 44, whereby two of said inputs can be selected at a time with switches 45 and 46. Said high level inputs are independent of each other allowing independent selection with switches 45 and 46. Each selected input has an independent balance control 51 and 52, respectively, and each having independent volume controls 53 and 54, as well as independent cue select switches 55 and 56 and corresponding cue switch indicator lights 57 and 58.

Furthermore, the audio mixer has two low impedance microphone inputs 61 and 62, each with independent volume controls 63 and 64, respectively and each with low (tone controls) 104 and 105 and high (tone controls) 106 and 107 equalization amplifiers 65 and 66 and each with separate balance controls 67 and 68.

As can now be seen, input phono signals 21 and 22 and 23 and input high level signals 41 or 42 and 43 or 44 are input into input summing amplifier 71.

Likewise, microphone signals 61 and 62 are input into a microphone summing amplifier 72.

The output of input summing amplifier 71 is input into a three stage (bass 101, midrange 102, and treble 103) tone control amplifier 73. The circuit also includes a mike to tape record select switch 74, a cue summing amplifier 75 and a cue volume control 76, the functions of which will be explained later.

A program summing amplifier 81 receives the output of tone control amplifier 73 where it is mixed with the output from the microphone summing amplifier 72.

The output of program summing amplifier 81 drives a V.U. meter 83, a monitor volume control 84, and a monitor output 90, and said output is available at a pre-out jack 85. The signal is fed into a line output amplifier 86 via a main-in jack 87 and controlled by a master gain control 88. The output of the line output amplifier 86 goes to a pair of program output jacks 93 and 99. Jack 93 is an RCA type and jack 99 is XLR type.

Retreating to the output of input summing amplifier 71 this output is also fed into tape output summing amplifier 82 for the primary purpose of simultaneously recording the phono inputs and high impedance inputs. By activating mike to tape switch 74 with corresponding indicator light 95 the output of mike summing amplifier 72 is mixed with the output of input summing amplifier 71. The output of tape summing amplifier 82 is fed into a tape recorder or other device to record the program inputs; via the tape out jacks 94 and 100 (both RCA type jacks) to record the program inputs (phono inputs and high impedence inputs). When making this tape, its value is often times in recording the music program and not having incidental microphone messages, from mike inputs 61 and 62, recorded onto this tape medium.

It can now be seen the value of the previously mentioned mike to tape record select switch 74, which can enable or disable the microphone signals to the tape output jacks 94 and 100.

Next it can be noted that the independent cue switches 31, 32, 33, 55 and 56 permit the operator to select one or more input signals individually or concurrently for the purpose of previewing through the cue summing amplifier 75, whose output includes cue volume control 76. The signal then passes to a cue power amplifier 89 and then to a pair of headphone output jacks 96 and 108 to drive an operator's headset (not shown).

A cue mono switch 77 is provided with a corresponding indicator light 78 when enabled combines the left and right 79 cue select signals, so that the operator listens to a monophonic signal. It should be noted that often times in the mixing process the operator will only use one side of the headset while the other ear is used to listen to the beat of the music in progress. With the left and right signals combined, he is able to synchronize the beat of the music and mix different sound sources together and arrive at a coherent musical program suitable for dancing or to be applied to magnetic tape. The operator can preview sound sources using this cue mono switch 77 and hear the beat regardless of which channel the beat is on (normally the beat is on both channels of a stereo recording; however, it occasionally starts on only one side for special effects).

Occasionally, during a performance, one channel of the stereo system may fail due to a loose cable connection or defective phono cartridge. If such a situation occurs, the operator can restore sound to all speakers in a "mono" state by an activating program mono switch 91, which when enabled combines left and right 97 outputs signals. Thus sound loss to the listener is minimal and a red L.E.D. indicator 92 lights to show that a mono output status exists.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A stereo pre-amplifier for mixing audio input signals comprising:
   (a) a means for supplying input signals including stereo phonograph signals and stereo auxilary level signals and low impedance signals to said pre-amplifier;
   (b) a means for supplying output signals from said pre-amplifier;
   (c) a first summing means for combining said phonograph signals and said auxilary level signals;
   (d) a second summing means for combining said low impedance signals;
   (e) a cueing means for sampling said input signals prior to said signals being input to said first summing amplifier said cueing means including a means to select one or more of said input signals to be sampled;
   (f) a third summing means for combining said sampled signals;
   (g) a fourth summing means combining the output of said first summing means and said second summing means whereby said fourth summing means provides pre-amplifier output;
   (h) a fifth summing means for combining the output of said first summing means and said second summing means whereby said fifth summing means provides an output to auxilary storage means;
   (i) a means for disabling the output of said second summing means from inputing into said fifth summing means;
   (j) a means for combining both stereo channels of the inputs of said fourth summing means whereby each of the output channels of said fourth summing means are monophonic signals; and
   (k) a means for combining both stereo channels of the output of said third summing means whereby each of the output channels of said third summing means are monophonic signals.

2. A stereo pre-amplifier according to claim 1, wherein said cueing means includes a switch means for said input signals said switch to tap said signal for input into said third summing means including a visual indicating means for indicating that said switch is enabled.

3. A stereo pre-amplifier according to claim 2, further including receiving means for each of said low impedance input signals, wherein the output of said first summing means includes a first tone control means and the receiving means for each of said low impedance input signals includes independent tone control means for each of said signals independent of said first tone control means.

4. A stereo pre-amplifier according to claim 3 wherein said means for combining both stereo channels of said fourth summing means and said third summing means includes a switch means.

5. A stereo pre-amplifier according to claim 4 wherein said indicating means comprises a light coupled thereto.

6. A method of mixing signals in a stereo pre-amplifier which comprises:

(a) supplying input signals from stereo channels to said pre-amplifier including stereo phonograph signals and stereo auxilary level signals;

(b) obtaining output of said signals from said pre-amplifier;

(c) mixing said phonograph signals and said auxilary level signals such that said signals are combined;

(d) selecting one or more of said signals for previewing prior to mixing of said signals; and (e) mixing said selected signals such that said signals are combined for audio previewing prior to pre-amplifier output including combining the stereo channels of said selected signals to obtain a monophonic signal on each stereo channel for audio previewing.

7. A method as in claim 6, further including coupling an indicator light to each said obtained monophonic signal to indicate which monophonic signal of said obtained output is audio previewed.

* * * * *